Sept. 15, 1964   M. O. LONGSTRETH ETAL   3,149,056
DEVOLATILIZING APPARATUS
Filed March 22, 1961   7 Sheets-Sheet 1

INVENTORS
Murrey O. Longstreth
and James L. Amos
BY

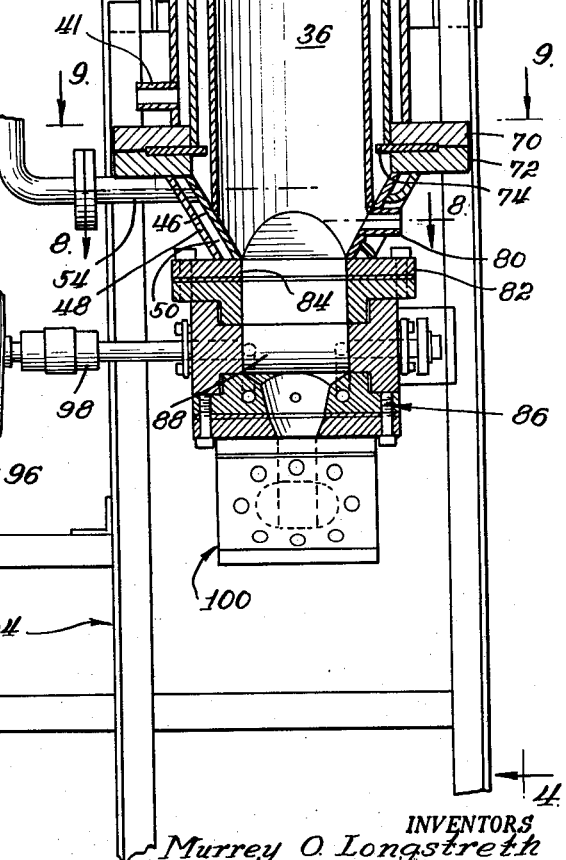

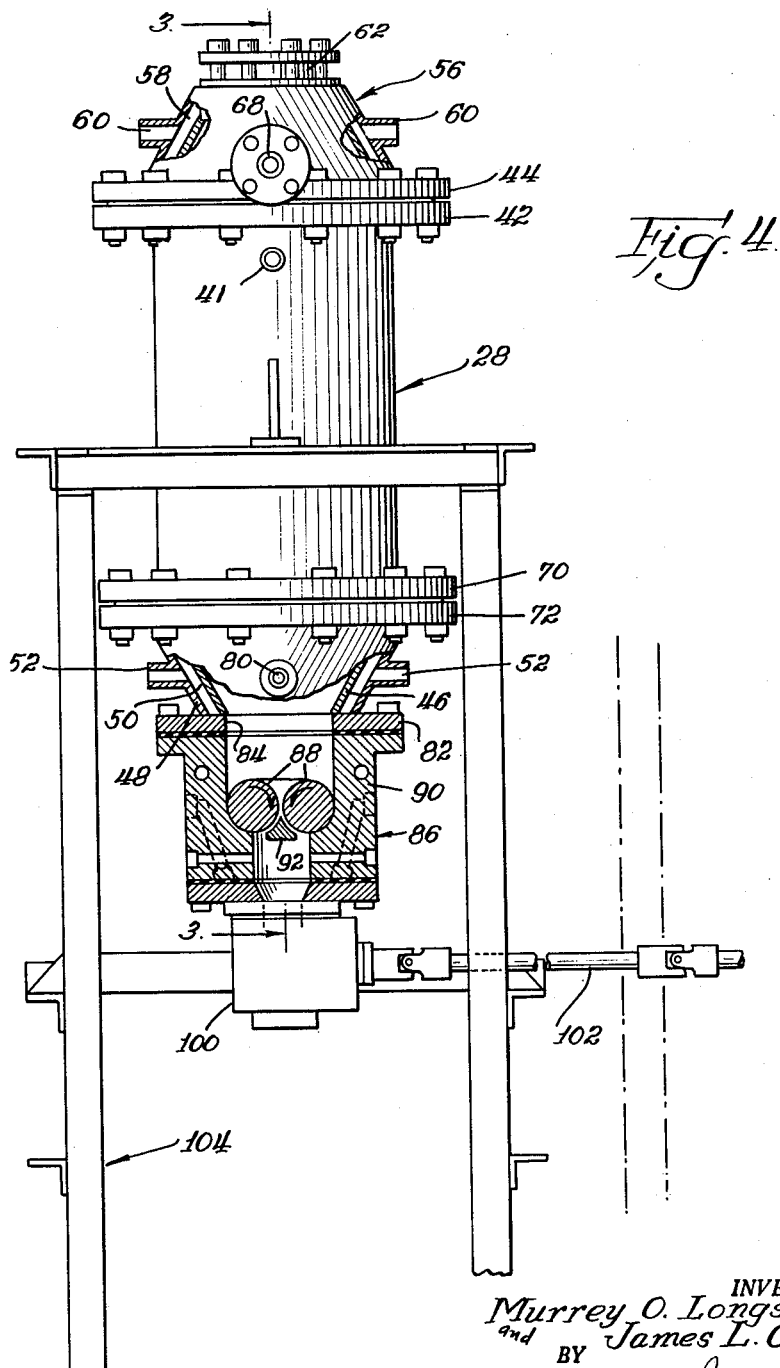

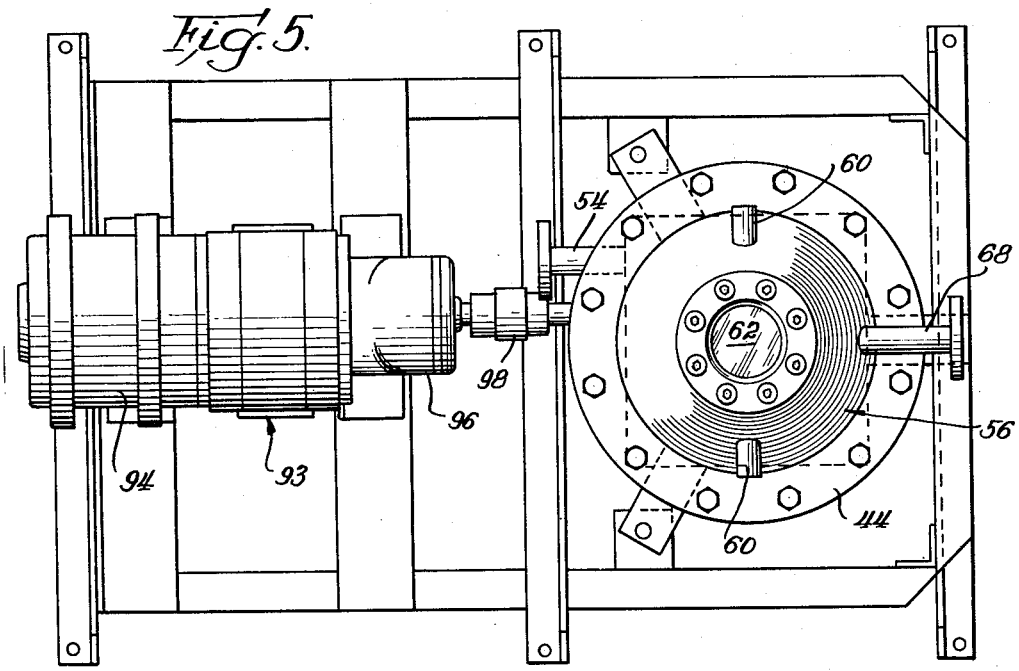
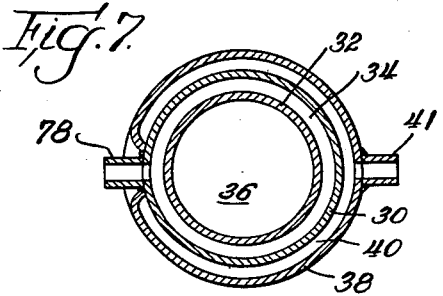
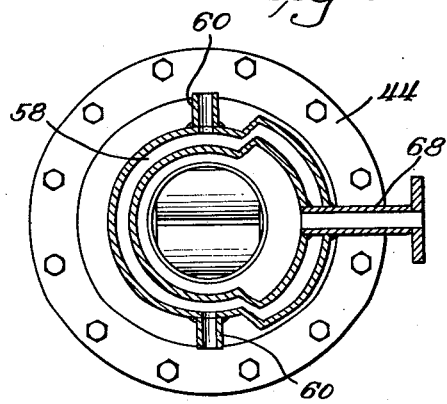
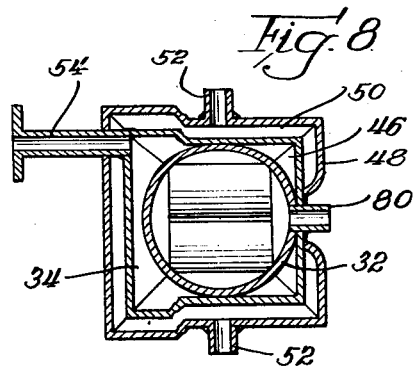

Sept. 15, 1964  M. O. LONGSTRETH ETAL  3,149,056
DEVOLATILIZING APPARATUS
Filed March 22, 1961  7 Sheets-Sheet 5

INVENTORS,
Murrey O. Longstreth
and James L. Amos
BY
Jerome Rudy
atty.

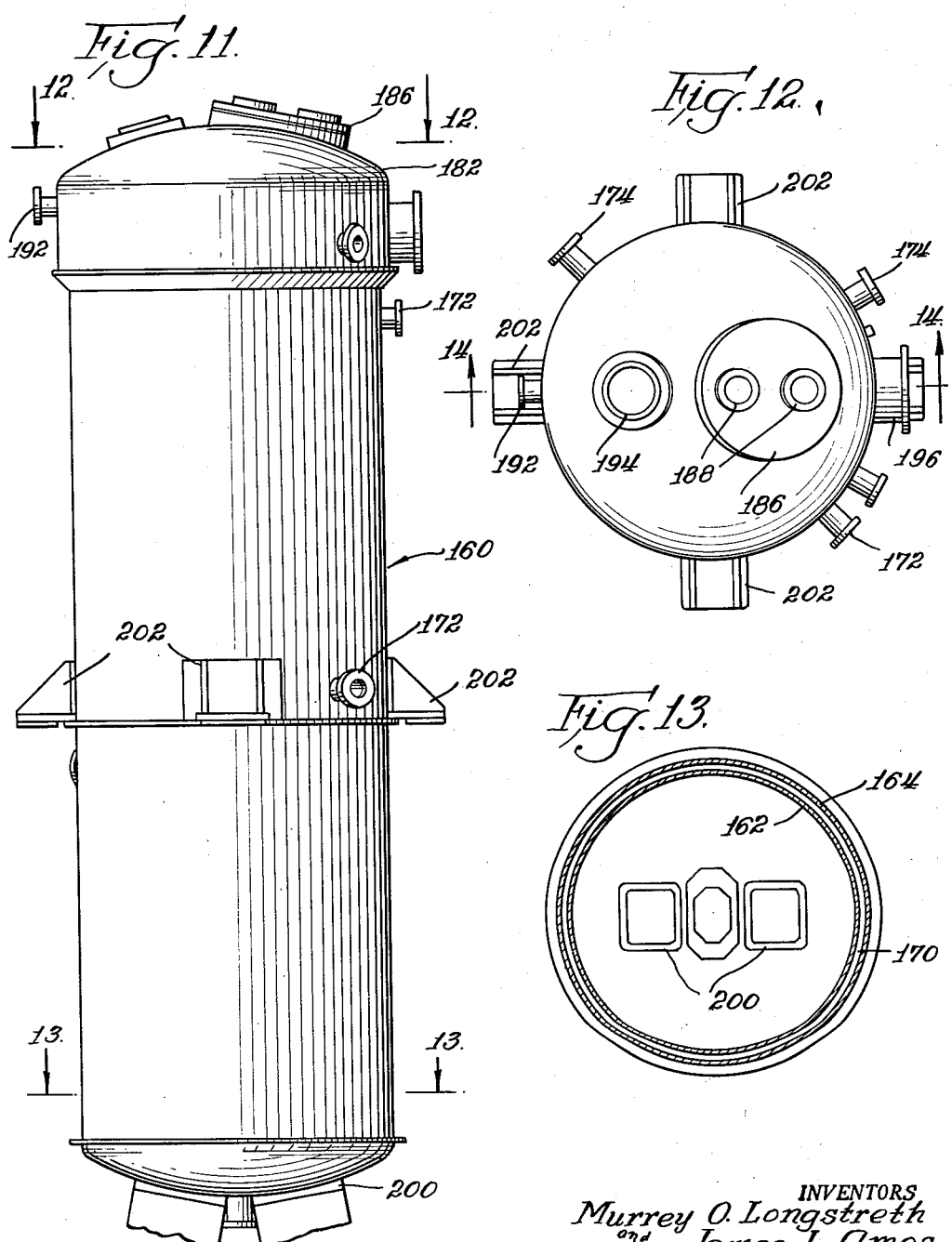

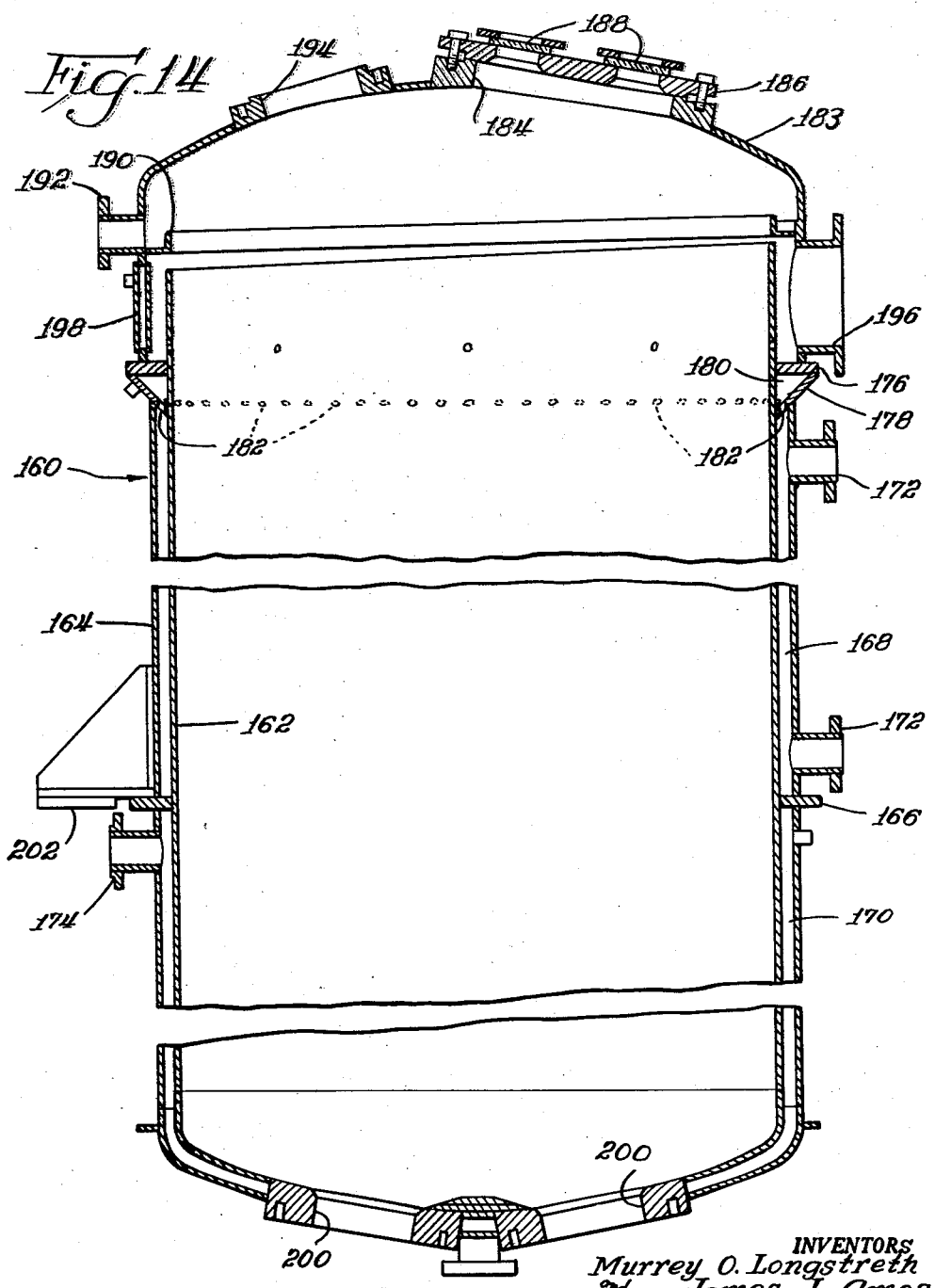

United States Patent Office 3,149,056
Patented Sept. 15, 1964

3,149,056
DEVOLATILIZING APPARATUS
Murrey O. Longstreth and James L. Amos, Midland, Mich., assignors to The Dow Chemical Company, Midland, Mich., a corporation of Delaware
Filed Mar. 22, 1961, Ser. No. 97,500
6 Claims. (Cl. 202—236)

This invention relates to an improved devolatilizing apparatus for removing various constituents from molten polymeric and other liquid compositions to be devolatilized.

The devolatilizer apparatus of the present invention represents an improvement over comparable apparatus of the prior art. Briefly, the subject apparatus is a falling film devolatilizer of a type comprising a vessel formed to provide a weir over which the heated polymeric composition flows into and down the walls of a devolatilizing chamber which is maintained under controlled sub-atmospheric pressure and temperature. The volatile matter released from the composition is condensed at the top of the chamber and drawn off, while the devolatilized polymer is collected at the bottom of the chamber where a metering pump is arranged for feeding the polymer to its point of use.

Advantageously, the devolatilizer of the present invention can be employed in coupled combination with, and fed by, a jacketed extruder.

Most devolatilizing extruders are formed with a devolatilizing port cut into the extruder barrel. This is not only costly, but creates a contamination problem and makes for an extruder of excessive length. Besides, it generally does not accomplish a thorough job of volatile removal. The combination of an extruder with a devolatilizer according to the present invention serves, as indicated, to solve such problem nicely.

Of additional special interest in practice of the present invention is the use of a roll pump at the lower end of the vessel for stuffing the devolatilized polymer into a subsequent discharge and/or metering pump. The roll pump allows the polymer to be handled while thick and viscous, even while it is at low temperature and, if desired or necessary, under sub-atmospheric pressure. It also provides positive and continuous flow rate, and permits low pot inventory to be maintained.

The main object of this invention is to provide an improved devolatilizing apparatus.

Another object is to provide a devolatilizer apparatus which is less costly, which produces a devolatilized polymer free of contamination, and which does a thorough job of volatile removal.

Still another object is to provide a devolatilizer wherein means are provided for stuffing a discharge pump connected to a devolatilizing vessel, said means handling polymer which is thick and viscous and even at low temperature or under sub-atmospheric pressure which provides positive and continuous flow rate, while permitting low pot inventory to be maintained.

A more specific object is to provide a devolatilizing apparatus comprising the use of a jacketed extruder coupled to a falling film devolatilizer.

These and further objects and features of the invention will become more apparent from the following description and accompanying drawings wherein:

FIG. 3 is a vertical section view of a devolatilizing vessel embodying the principles of the invention;

FIG. 4 is a view generally as seen from line 4—4 in FIG. 3, showing certain elements thereof in vertical section;

FIG. 5 is a plan view of the apparatus shown in FIG. 3;

FIG. 6 is a section view generally as seen from line 6—6 in FIG. 3;

FIG. 7 is a section view generally as seen from line 7—7 in FIG. 3;

FIG. 8 is a section view generally as seen from line 8—8 in FIG. 3;

FIG. 9 is a section view generally as seen from line 9—9 in FIG. 3;

FIG. 11 is an exterior vertical view of another modified form of devolatilizer embodying the principles of the invention;

FIG. 12 is a view generally as seen from line 12—12 in FIG. 11;

FIG. 13 is a section view generally as seen from line 13—13 in FIG. 11; and

FIG. 14 is a vertical section view generally as seen from line 14—14 in FIG. 12.

Figure 1:
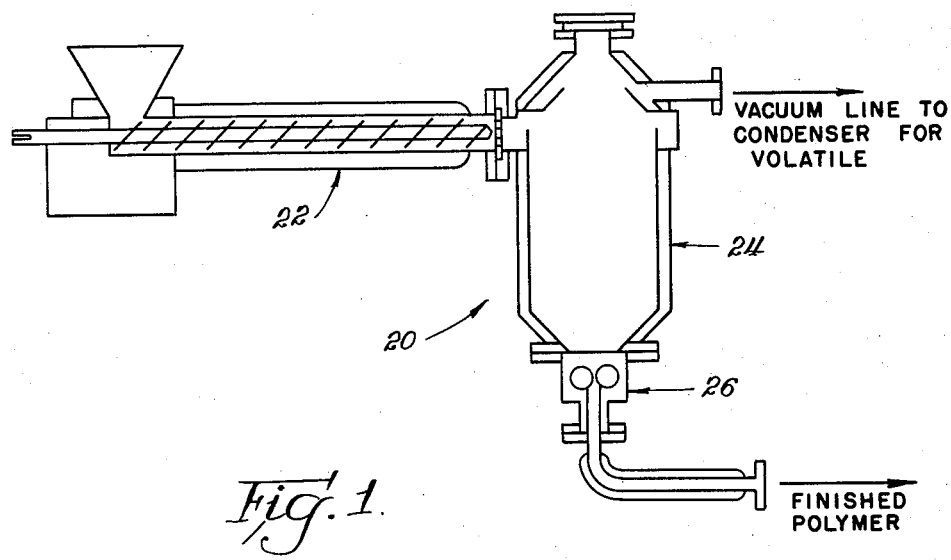
FIG. 1 is a schematic illustration of devolatilizing apparatus representative of an embodiment of the invention.
Figure 2:
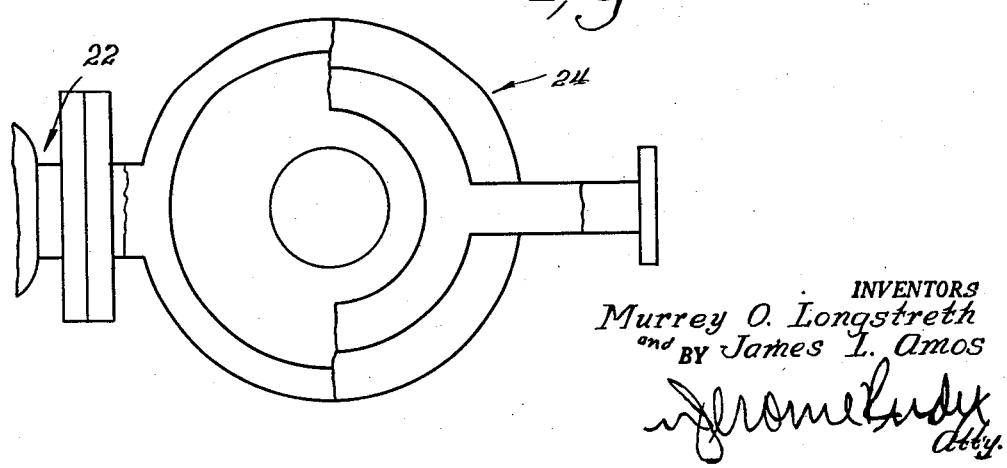
FIG. 2 is a plan view, in partial broken section, of the devolatilizer of FIG. 1.

Referring now to the drawings, and more particularly to FIG. 1, numeral 20 identifies an overall assembly including devolatilizing apparatus representative of an embodiment of the invention. A jacketed extruder 22 is, in the illustrated instance, coupled to a falling film devolatilizer 24, although, if desired, any other suitable pump arrangement or feed means (not shown) can be employed for charging the material to be devolatilized to the devolatilizer 24. When an extruder is employed for feeding the devolatilizer 24, it may be of the type and have operating characteristics similar to that disclosed in U.S. 2,530,409. A pump assemblage 26 is connected at the discharge end of the devolatilizer 24 for pumping the devolatilized polymer to a point of subsequent use.

A devolatilizer 28 according to the invention, and shown in greater detail in FIGS. 3 to 9, includes an outer vessel 30, arranged in spaced relation to an inner vessel 32 to form a chamber 34, the inner wall of which defines a devolatilizing chamber 36. A jacket 38 surrounds the outer vessel 30 in spaced relation thereto to provide a chamber 40, having pipe nipples 41 arranged for connection to a source of heated liquid to be circulated through the chamber 40. Advantageously, a generally cylindrical construction is employed, although the devolatilizer can, if desired, have conical or otherwise geometrically configured walls providing the shape is adapted to prevent free falling of the polymer being treated through the devolatilization chamber. The jacket 38 and vessel 30 are connected in liquid tight manner at the upper end to a header comprising a disc-like plate 42, which has a similar plate 44 secured at the top thereof. The lower end of the chamber 34 is closed by a generally rectangular transition portion 46, which is surrounded by a jacket 48 in spaced relation, to form a chamber 50. Pipe nipples 52 are adapted for connection to a source of liquid which may be circulated through the chamber 50 for temperature control thereof as required. An inlet pipe 54 connects with the chamber 34 for admission of a polymer material to the chamber from an extruder 22.

Extending upward from the header plate 44 is a vapor condensing portion 56 having spaced walls defining a frusto-conical chamber 58. This is served by a pair of pipe nipples 60 for connection to a source of low temperature medium for circulation through the chamber 58. A peep-hole (or sight glass) in the form of a glass plate 62 is advantageously arranged in the top of the condensing portion 56. A sleeve 64 is positioned in the header plate 44 and extends above the upper surface to form a trough, or reservoir, 66 for collection of condensate formed in the inner wall of the condensing chamber 58. An outlet pipe 68 connects with the reservoir 66 for removal of condensate therefrom.

The lower end of the outer vessel 30 and the jacket 38 are connected to a disc-like plate 70. A similar plate 72 is secured to the bottom of plate 70. Positioned between the plates 70 and 72 is a ring or baffle 74, which serves as a pressure distributing means to equalize and assure even flow of material up through the chamber 34. For such purpose, the inner periphery of the ring 74 is spaced a given distance from the outer wall of the vessel 32. The upper end of the vessel 32 is spaced a short distance from the lower surface of the plate 44. This forms a weir 76 for spillover of material from the chamber 34 into the vessel 32 for flow down the wall thereof. A thermocouple well 78 is arranged for connection with the chamber 34. A similar thermocouple well 80 is arranged for connection to the devolatilizing chamber 36.

Chamber 50 is closed at the lower end by a plate 82 having an opening 84 through which the devolatilized polymer will flow from chamber 36, into a roll pump assembly 86. The latter includes a pair of parallel rollers 88 which are spaced apart a short distance, and are in sliding engagement with a lower curved wall portion of a housing 90, as best seen in FIG. 4. A knife-edge divider bar 92 may be positioned, as shown, between the rollers 88, and in spaced relation thereto. In most cases, however, such a divider is neither advantageous nor necessary and is better eliminated in order to avoid pressure build up in and constrainment of the viscous material going through the rolls, since it is generally desirable to afford as free and unrestricted a passage as possible. The roll pump 88 is driven by a power means 93 including a motor 94 operating through a reduction gear assemblage 96, which is coupled to a drive shaft 98, connecting one of the rollers 88. Gear means (not shown) may advantageously be employed to couple the rollers 88 so that they rotate in opposite directions, beneficially (although not absolutely necessarily) at the same speed.

The roll pump 86 is arranged to discharge into a metering or other forwarding pump 100, through which the devolatilized polymer is passed to point of usage. A drive shaft 102 is connected to the metering pump 100, which shaft is rotated by a power means (not shown).

A frame, or stand means, 104 is arranged for the support of the devolatilizer 28 and the power means 93.

The operation of the devolatilizer 28, in essence, is as follows: A heated polymeric (or other) composition to be devolatilized flows through the inlet pipe 54 into the lower end of the chamber 34 and upward past the baffle 74 to the top of the chamber. From this point, the polymer flows over the weir 76, thence uniformly down and along the inner wall of the vessel 32 in a film and at a predetermined rate. A sub-atmospheric pressure is advantageously maintained in the devolatilizing chamber 36 (preferably by a vacuum maintained in the outlet pipe 68), although in some cases and with certain materials the operation need not be conducted under reduced pressure. The volatile matter removed from the composition (as it flows downwardly in the chamber) rises and makes contact with the cooled wall of the condensing portion 56. This causes it to condense and flow into the reservoir 66 and then to the outlet pipe 68. The devolatilized medium leaving the lower end of the chamber 36 will be forced, or stuffed, by the roll pump 86 into the metering or other forwarding pump 100 which transfers it to an intended point of use.

To illustrate the results achieved from operation of a devolatilizer made as above described, a polymeric composition containing 80 weight percent styrene polymer solids and 20 weight percent volatile solvent (primarily ethyl benzene with some styrene monomer) was fed into the unit at 240° C. under an absolute pressure of 100 mm. Hg. The devolatilized polystyrene leaving the unit was free of black specks, had good color, and had a residual volatile content of only 1.0 percent. After operation of the unit continuously for six months, the unit was dismantled. Even after such an extended period of use, the walls of the chamber 36 were free of any black deposits or other evidence of polymer decomposition.

The improved results produced with the devolatilizer of the invention is due primarily to the fact that the wall of the devolatilizer is uniformly covered and protected with a thin falling film of material, even though it may be exposed to a sub-atmospheric pressure for a comparatively long period of time. This arrangement is beneficial in allowing more complete devolatilization of the polymeric composition and tending to avoid decomposition and contamination of or by the material being treated and/or the volatiles being removed. It is to be noted that the pump arrangement 86 and 100 eliminates pulsation in the issuing stream, while the falling film arrangement also serves as a reservoir to damp out extruder surges. The feed to the extruder or other devolatilizer supply means could be intermittent and the output constant if this were desirable due to the damping effect of the system.

Figure 10:
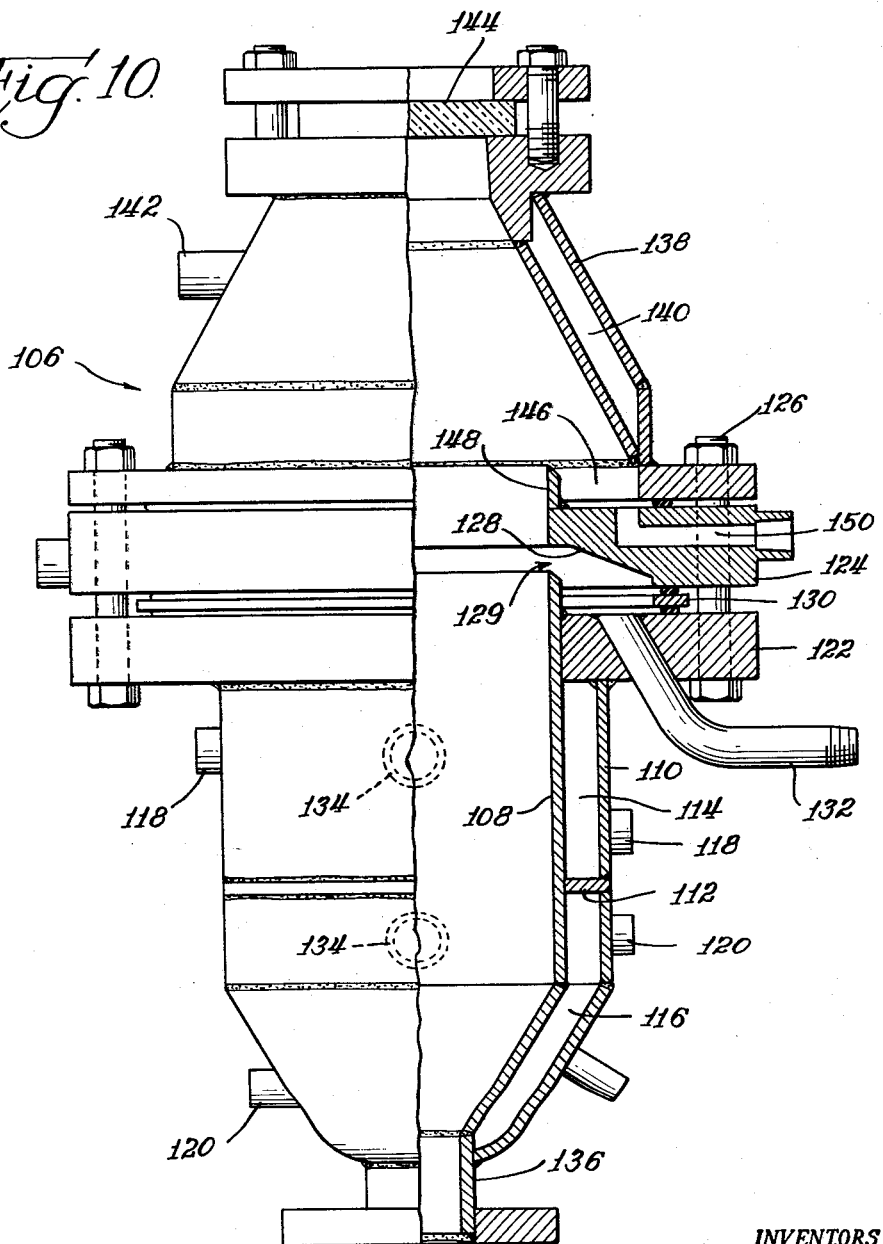
FIG. 10 is a vertical view in partial section of a modified form of devolatilizer embodying the principles of the invention.

A modified devolatilizer 106, representative of an embodiment of the invention and incorporating the features of the devolatilizer above described, is illustrated in FIG. 10. The devolatilizer 106 includes an inner vessel 108 (advantageously cylindrical), surrounded by an outer vessel 110 in spaced relation thereto. A divider plate 112 forms two chambers 114 and 116, which have pipe nipples 118 and 120, respectively, for connection to sources of medium for selectively controlling the wall temperatures of the inner vessel 108. The upper end of chamber 114 is closed by a disc-like plate 122, while a disc-like plate 124 is secured there-above by a plurality of bolt means 126. The plate 124 has a recess 128 on the lower side providing a clearance space 129 for the upper end of the inner vessel 108. A spacer plate, or ring 130 is arranged between the plates 122 and 124, whereby the vertical width of the clearance space 129 may be adjusted.

An inlet pipe 132 is arranged to extend through the plate 122 for inflow of a polymeric composition upward through the recess 128; then over the edge of the inner vessel 108; and afterwards down the internal wall thereof. One or more thermocouple wells 134 may be provided for obtaining temperature of the polymeric or other composition as it flows downward within the vessel 108. An outlet pipe 136 is arranged at the bottom of the devolatilizer for flow of the devolatilized material into pump means (not shown).

Positioned atop the plate 124 (and supported thereby) is a vapor condensing portion 138 having spaced walls defining a frusto-conical chamber 140. This is served by a pair of pipe nipples 142 (one shown) for connection to a source of low temperature medium for circulation through the chamber 140. A sight glass 144 is arranged in the top of the condensing portion 138. Condensate formed on the inner wall of the condensing chamber 140 will flow into a trough, or reservoir, 146 which is defined in part by a sleeve 148 seated upon the plate 124. Collected condensate flows through a passageway 150 formed in the plate 124 and out of a pipe means (not shown).

Operation of the devolatilizer 106 is generally similar to that of the devolatilizer 28, insofar as the polymeric or other composition being treated is caused to flow down the inside of the vessel 108 as a thin film under any desired pressure, including sub-atmospheric, in the vessel. Devolatilizers according to the second described embodiment also produce excellent devolatilized product having good color and being free of contamination.

A further embodiment, also incorporating the principles of the invention, is illustrated in FIGS. 11 to 14. As seen therein, a devolatilizer 160 includes an inner vessel 162 (also advantageously cylindrical) surrounded in spaced relation by an outer vessel 164. A partition 166 separates the volume between vessels 162 and 164 into chambers 168 and 170. Pipe nipples 172 and 174 are arranged so that heating medium may be circulated through the chambers 168 and 170, respectively, for selectively controlling the surface temperature of the inner vessel 162. A ring, or collar, 176 is secured to the outside of the inner vessel 162. A plate 178 is arranged at an angle beneath the ring 176 to form a triangular chamber 180 which extends about the vessel 162, as is best seen in FIG. 14. A plurality of holes 182 formed in the plate 178 interconnect the chambers 168 and 180.

A cover, or dome, 183, supported upon the collar 176, includes a manhole 184, having a plate 186, with a pair of glass peep-holes 188, and a flanged ledge 190 extending about the inner wall of the dome which serves as a trough, or reservoir, for collecting condensate formed on the inner wall of the dome. An outlet pipe connection 192 is arranged for draining the trough of the condensate. A vapor outlet 94 is arranged at the top of the dome 183, while a material inlet pipe nipple 196 is arranged on the side of the dome. It will be noted that the upper edge of the vessel 162 (which serves as a weir) is sloped so that the narrowest space between the weir and the ledge 190 is in the vicinity of the inlet nipple 196. In such manner, the flow of polymeric composition over the upper edge of the vessel 162 is uniform with a thin film being thereby caused to pass down the inner wall of the vessel 162. A chamber 198 is formed in the side wall of the dome 183. This may be served by pipe means (not shown) for circulation of a heating medium through the chamber 198 to maintain temperature, as required for proper handling of the composition being devolatilized. Outlet means 200 are provided on the bottom end of the unit, whereby devolatilized material may be fed into a pump means, as in the case of the first described embodiment. Support means 202 are affixed to the outside of the vessel 164. These permit the devolatilizer to be maintained in an upright, preferably vertical, position.

The operation of the devolatilizer 160 is similar to that described in connection with the first two embodiments. It produces results at least as good as those defined, all in accordance with the objectives of the invention.

The foregoing description has been given in detail without thought of limitation since the inventive principles involved are capable of assuming other forms without departing from the spirit of the invention or the scope of the following claims.

What is claimed is:

1. Devolatilizing apparatus for viscous material comprising an inner vessel with an upright wall surface, an outer vessel surrounding the inner vessel and in spaced relation thereto to form a fluid receptive chamber therebetween, a header affixed to the top of said outer vessel and defining a peripheral orifice with the top edge of said inner vessel, said orifice defining a weir means for regulating overflow of said fluid form said chamber onto the wall of said inner vessel to pass down said wall in a thin film and uniformly about the periphery thereof, inlet means for admitting a viscous fluid to be devolatilized into the lower end of said chamber, a vapor condensing means enclosing the upper end of said inner vessel to condense volatile matter released from said fluid as it flows downwardly in the inner vessel, peripheral channel forming collector means above said weir means to collect the condensed vapor and a liquid outlet for said condensed vapor collecting means, and outlet means for removing the devolatilized fluid from said inner vessel.

2. The devolatilizing apparatus of claim 1 having, in addition, means to expose the inside of said inner vessel to a sub-atmospheric pressure.

3. The devolatilizing apparatus of claim 1, wherein said inlet means for admitting said viscous fluid comprises an extruder.

4. The devolatilizing apparatus of claim 1 wherein said outlet means for the devolatilized fluid comprises a pump means adapted to handle said fluid.

5. The devolatilizing apparatus of claim 1 wherein said peripheral orifice has a varying width with its narrowest portion on that side of the chamber as said inlet means.

6. Devolatilizing apparatus for viscous material comprising an inner vessel with an upright wall surface, an outer vessel surrounding the inner vessel and in spaced relation thereto to form a fluid receptive chamber therebetween, a header affixed to the top of said outer vessel and defining a peripheral orifice with the top edge of said inner vessel, said orifice defining a weir means for regulating overflow of said fluid from said chamber onto the wall of said inner vessel to pass down said wall in a thin film and uniformly about the periphery thereof, a baffle plate extending into said chamber for controlling the rate of fluid flow therethrough, an extruder for admitting a viscous fluid to be devolatilized into the lower end of said chamber, a vapor condensing means enclosing the upper end of said inner vessel to condense volatile matter released from said fluid as it flows downwardly in the inner vessel, peripheral channel forming collector means above said weir means to collect the condensed vapor and a liquid outlet for said condensed vapor collecting means, a jacket surrounding said outer vessel and forming a heating chamber therebetween, inlet and outlet means to circulate a heating medium through said jacket to regulate the temperature of the wall of said outer vessel, and a pump means comprising a forwarding discharge pump located at the lower end of said inner vessel, and a roll pump for stuffing said discharge pump with devolatilized fluid from said inner vessel.

References Cited in the file of this patent

UNITED STATES PATENTS

| | | |
|---|---|---|
| 838,314 | Fricke | Dec. 11, 1906 |
| 891,492 | Lloyd | June 23, 1908 |
| 1,214,300 | Grouvelle et al. | Jan. 30, 1917 |
| 1,786,080 | Newhouse | Dec. 23, 1930 |
| 2,040,837 | Yarmett | May 19, 1936 |
| 2,355,057 | Copeland | Aug. 8, 1944 |
| 2,767,437 | Marshall | Oct. 23, 1956 |
| 3,009,208 | Pirot | Nov. 21, 1961 |

FOREIGN PATENTS

| | | |
|---|---|---|
| 6,916 | Great Britain | 1905 |
| 281,743 | Switzerland | Mar. 31, 1952 |